INVENTOR.
Keith W. Kampert
BY Paul O. Pippel
Atty.

United States Patent Office 3,123,123
Patented Mar. 3, 1964

3,123,123
ELASTOMER TIRE DRIVE AND SEAL
Keith W. Kampert, Libertyville, Ill., assignor to The Frank G. Hough Co., a corporation of Illinois
Filed Sept. 12, 1961, Ser. No. 137,547
8 Claims. (Cl. 152—397)

This invention relates generally to vehicle tire and wheel assemblies, and more particularly to a novel arrangement for sealing a tubeless tire on a wheel and for transmitting the driving torque from the wheel hub directly through an elastomer ring to the tire.

The primary object of the present invention is to provide a simple tire mounting arrangement for a vehicle wheel, especially for wheel arrangements such as used on large vehicles such as earth moving vehicles or tractors.

Another object of the present invention is to provide a novel elastomer ring driving arrangement between the tire and the wheel hub for the tire.

A further object is to provide a novel air sealing arrangement for relatively large tubeless tires which will permit easy insertion of the tire and tire flanges on a wheel hub wtih simple means for sealing the tire beads to permit air to be inserted in the tire.

Other objects and features of the present invention will be apparent upon a perusal of the following specification and drawings, in which.

The present embodiment is the preferred embodiment, but it is to be understood that changes can be made in the present embodiment by one skilled in the art without departing from the spirit and scope of the present invention.

In the use of large tubeless tires for earth moving vehicles, many difficulties are encountered in mounting the tires upon the wheel hubs; one of the most troublesome problems being the relative difficulty of initially sealing the tire bead to enable air to be inserted in the tire. Generally, the present invention contemplates a tire mounting arrangement for a wheel hub such as the relatively large planetary type wheel hubs used in earth moving vehicles. These large diameter wheel hubs are also generally of considerable depth, and the present invention contemplates the forming of a shoulder on the outer surface of such a wheel hub. A pair of tire flanges is provided and it is not necessary that the inner diameter of the tire flanges be extremely close fitting to the outer diameter of the wheel hub because the driving torque is not carried through the flanges to the tire. One of the tire flanges is slipped over the hub and against the shoulder on the wheel hub. A continuous elastomer ring is then slipped over the hub and against the mounted tire flange. Certain tubular spacers are inserted through a number of holes in the elastomer ring. A plurality of bolts are then inserted through the mounted tire flange and the inserted spacer tubes in the elastomer ring. The elastomer ring in its normal relaxed state has a thickness which when measured in an axial direction is greater than the length of the tubular spacers.

The tubeless tire is then slipped over the elastomer ring and against the mounted tire flange. The second tire flange is then inserted over the hub and the projecting ends of the bolts and nuts are threaded onto the bolts to draw the second tire flange toward the tubular spacers. As the tire flanges are drawn toward each other by the tightening of the nuts, the elastomer ring is axially compressed until the tire flanges engage each end of the tubular spacers. The axial compression of the elastomer ring will cause a radial expansion of the elastomer ring between the surface of the hub and the tire beads to produce an air seal between the tire beads and the elastomer ring. Air may then be inserted into the tire and the air will, in pressurizing the tire, force the tire beads tightly against the elastomer ring and will further force the elastomer ring tightly against the wheel hub. Importantly, the driving torque for the tire is then carried from the wheel hub directly through the elastomer ring in frictional contact therewith and from the elastomer ring to the tire which is in tight frictional contact therewith. Thus it may be seen that the driving torque is not carried through the tire flanges.

Figure 1:
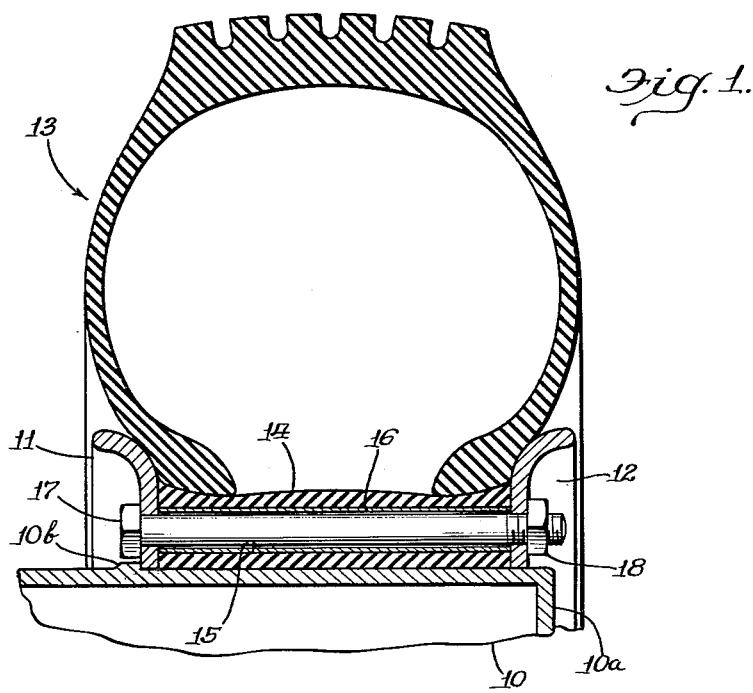
FIGURE 1 is a cross sectional view of a tire and hub assembly constructed according to the present invention.
Figure 4:
FIGURE 4 is a reduced perspective view of one of the tubular spacers used in the arrangement shown in FIGURE 1.

In detail, a portion of a wheel hub 10 is shown in cross section in FIGURE 1. The axial outward end of the wheel hub is indicated at 10a. The outer surface of the wheel hub 10 is provided with an integral shoulder 10b formed circumferentially thereabout and spaced inwardly from the end 10a of the hub 10. A pair of tire flanges 11 and 12 are provided. Each of the tire flanges 11 and 12 is formed as a ring with an inner diameter slightly larger than the outer diameter of the wheel hub 10 to permit easy mounting of the flanges on the hub 10. The outer peripheral portion of the tire flanges 11 and 12 are curved to form a smooth tire engaging surface. A tubeless tire is indicated generally at 13.

Figure 2:
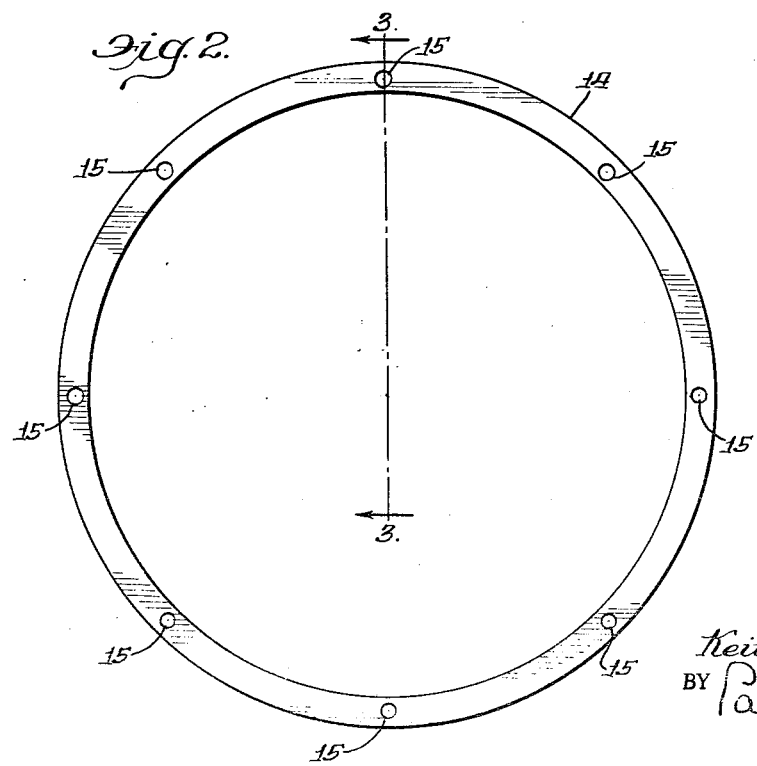
FIGURE 2 is a reduced side elevational view of the elastomer ring used in the assembly of FIGURE 1.
Figure 3:
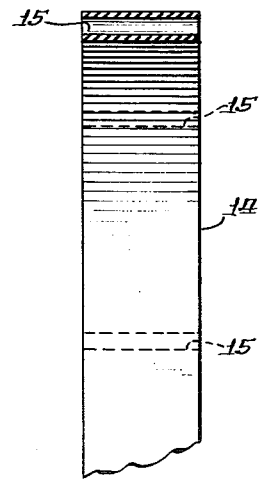
FIGURE 3 is a cross sectional view of the elastomer of FIGURE 2 and taken along the line 3—3 of FIGURE 2.

An elastomer ring 14 is also provided and is formed of a resilient material such as rubber. The elastomer ring has a natural inner diameter substantially equal to the outer diameter of the wheel hub 10 and an outer diameter substantially equal to the inner diameter of the tire 13. The elastomer ring 14 is further provided with a plurality of holes 15 axially formed therethrough. The holes 15 are positioned in a spaced apart relationship to each other about the elastomer ring 14 as may be seen in FIGURE 2.

A plurality of tubular spacers 16 are also provided. The tubular spacers 16 are equal in number to the number of holes 15 in the elastomer ring 14. Each tubular spacer 16 has an outer diameter substantially equal to the diameter of the holes 15 and has a length shorter than the natural axial width of the elastomer ring 14.

A plurality of bolts 17 and nuts 18 of a number equal to the number of tubular spacers 16 is also provided.

In the operation of the invention, the tire flange 11 is first mounted on the hub 10 in engagement with the shoulder 10b of the hub 10. The elastomer ring 14 with the tubular spacers 16 in the holes 15 is then inserted on the wheel hub 10 and against the tire flange 11. The bolts 17 are then inserted through the holes in the tire flange 11 and through the tubular spacers 16 to extend outwardly of the hub. The tire 13 is then slipped over the elastomer ring 14 and against the tire flange 11. The tire flange 12 is then mounted on the hub 10 and over the extending threaded portions of the bolts 17. The nuts 18 are then threaded on the bolts 17 and drawn up until the tire flange 12 is securely against one end of the tubular spacers 16 and the other end of the tubular spacers 16 are securely against the other tire flange 11.

In the process of drawing up the nuts 18, the elastomer ring 14 is compressed between the tire flanges 11 and 12 with a consequent thickening of the elastomer ring 14 in its radial dimension. The elastomer ring 14 must have a natural radial thickness such that when the nuts 18 are drawn up to a position such as shown in FIGURE 1, an air seal is provided between the tire beads and the outer surface of the elastomer ring 14.

Air may then be inserted into the tire, and as the tire is pressurized, the air pressure will cause the tire beads to be forced against the elastomer ring 14 and the elastomer ring 14 will be pressed in tight frictional engagement with the outer surface of the wheel hub 10. As the wheel hub 10 is driven, the driving torque will be carried from the outer surface of the wheel hub 10 directly through the elastomer ring 14, and from the elastomer ring 14 the torque will be delivered to the tire 13. It should be noted that the driving torque does not pass through the tire flanges 11 and 12 and therefore the frictional engagement of the tire flanges 11 and 12 with the outer surface of the wheel hub 10 is of little importance.

Having described the invention, what is considered new and desired to be protected by Letters Patent is:

1. A vehicle wheel construction comprising a wheel hub having a cylindrical peripheral portion, a pneumatic tire, an elastomer ring, said elastomer ring mounted on said cylindrical peripheral portion of said hub, said tire mounted on said elastomer ring, a pair of annular flanges loosely fitted one on each side of said elastomer ring and the beads of said tire, a plurality of tubular spacer members positioned axially through said elastomer ring in a spaced apart relationship to each other about said ring, a plurality of fasteners, said fasteners carried through said tubular spacer member and said pair of flanges for securing said pair of annular flanges against said tubular spacer members, and said elastomer ring having a natural axial width greater than the length of said tubular spacer members.

2. A vehicle wheel construction as defined in claim 1, and an annular shoulder formed on the outer surface of said cylindrical peripheral portion of said hub for spacing said pair of flanges a certain distance from the outer end of said hub.

3. A vehicle wheel construction comprising, a wheel hub having a cylindrical peripheral portion, an elastomer ring having an axial width substantially greater than the radial thickness thereof, said elastomer ring carried on the outer surface of said cylindrical peripheral portion of said hub, a pneumatic vehicle tire positioned with the bead portions thereof on said elastomer ring, means for retaining said tire beads against axial spreading, said means comprising flanges and a plurality of fastener means, said fastener means securing said flanges against said bead portions, whereby said tire is driven from said hub directly through said elastomer ring.

4. A vehicle wheel construction comprising, a wheel hub having a cylindrical peripheral portion, an elastomer ring having an axial width which is substantially greater than the radial thickness thereof, said elastomer ring carried on the outer surface of said cylindrical peripheral portion of said hub, a pneumatic vehicle tire positioned with the bead portions thereof on said elastomer ring, and means for partially axially compressing said elastomer ring to form an air seal between said tire beads and said elastomer ring and for maintaining said tire beads against axial spreading, said means comprising a pair of annular flanges loosely fitted on said cylindrical peripheral portion of said wheel hub, and fastener means secured between said annular flanges, whereby said tire is inflatable to produce substantial air pressure in said tire to urge said tire beads in tight frictional contact with said elastomer ring and to urge said elastomer ring in tight frictional contact with said outer surface of said cylindrical peripheral portion of said hub.

5. A vehicle wheel construction comprising, a wheel hub having a cylindrical peripheral portion, an elastomer ring having an axial width which is substantially greater than the radial thickness thereof, said elastomer ring carried on the outer surface of said cylindrical peripheral portion of said hub, a pneumatic tire positioned with the bead portions thereof on said elastomer ring, a plurality of tubular spacer members positioned axially through said elastomer ring in a spaced apart relationship to each other about said ring, a pair of annular flanges loosely fitted on the outer surface of said cylindrical peripheral portion of said hub on each side of said elastomer ring and with said tire beads therebetween, a plurality of fasteners secured through said tubular spacer members and said annular flanges for securing said annular flanges against each end of said tubular spacer members, said elastomer ring having a natural axial width greater than the length of said tubular spacer members so that said elastomer ring is partially axially compressed when said fasteners secure said annular flanges against each end of said tubular spacer members to form an air seal between said tire beads and said elastomer ring whereby said tire is inflatable to produce substantial air pressure in said tire to urge said tire beads in tight frictional contact with said elastomer ring and to urge said elastomer ring in tight frictional contact with the outer surface of said cylindrical peripheral portion of said hub, whereby said tire is driven from said hub directly through said elastomer ring.

6. A vehicle wheel construction as defined in claim 5, wherein the outer surface of said cylindrical peripheral portion of said hub is formed with an annular shoulder engaging one of said annular flanges to axially position said annular flanges on said hub.

7. A vehicle wheel construction comprising, a wheel hub having a cylindrical peripheral portion, an elastomer ring having an axial width which is substantially greater than the radial thickness thereof, said elastomer ring further having substantially a cross-section of a quadrilateral shape including inner and outer axial surfaces, said elastomer ring inner surface carried on the outer surface of said cylindrical peripheral portion of said hub, a pneumatic vehicle tire positioned with the bead portions thereof on the outer axial surface of said elastomer ring, a pair of annular flanges mounted on said peripheral portion, at least one of said flanges being axially movable relative to said hub, and fastening means engaging each of said flanges for drawing said flanges together for partially axially compressing said elastomer ring to form an air seal between said tire beads and said elastomer ring and for maintaining said tire beads against axial spreading, whereby said tire is inflatable to produce substantial air pressure in said tire to urge said tire beads in tight frictional contact with said elastomer ring outer surface and to urge said elastomer ring inner surface in tight frictional contact with said outer surface of said cylindrical peripheral portion of said hub.

8. A vehicle wheel construction comprising, a wheel hub having a cylindrical peripheral position, an elastomer ring having an axial width which is substantially greater than the radial thickness thereof, said elastomer ring further having substantially a cross-section of a quadrilateral shape including inner and outer axial surfaces, said elastomer ring inner surface carried on the outer surface of said cylindrical peripheral portion of said hub, a pneumatic vehicle tire positioned with the bead portions thereof on the outer axial surface of said elastomer ring, a pair of flanges loosely fitted on said cylindrical peripheral portion of said wheel hub, and at least one fastener means secured between said flanges to draw said flanges together and partially axially compress said elastomer ring to form an air seal between said tire beads and said elastomer ring and for maintaining said tire beads against axial spreading whereby said tire is inflatable to produce substantial air pressure in said tire to urge said tire beads in tight frictional contact with said elastomer ring outer surface and to urge said elastomer ring inner surface in tight frictional contact with said outer surface of said cylindrical peripheral portion of said hub.

References Cited in the file of this patent

UNITED STATES PATENTS

| | | |
|---|---|---|
| 1,126,232 | Lane | Jan. 26, 1915 |
| 1,150,986 | Besser | Aug. 24, 1915 |
| 1,647,205 | Wais | Nov. 1, 1927 |

FOREIGN PATENTS

| | | |
|---|---|---|
| 198,640 | Austria | July 10, 1958 |